B. PICQUET.
Seed Planter.
No. 30,887.
Patented Dec. 11, 1860.
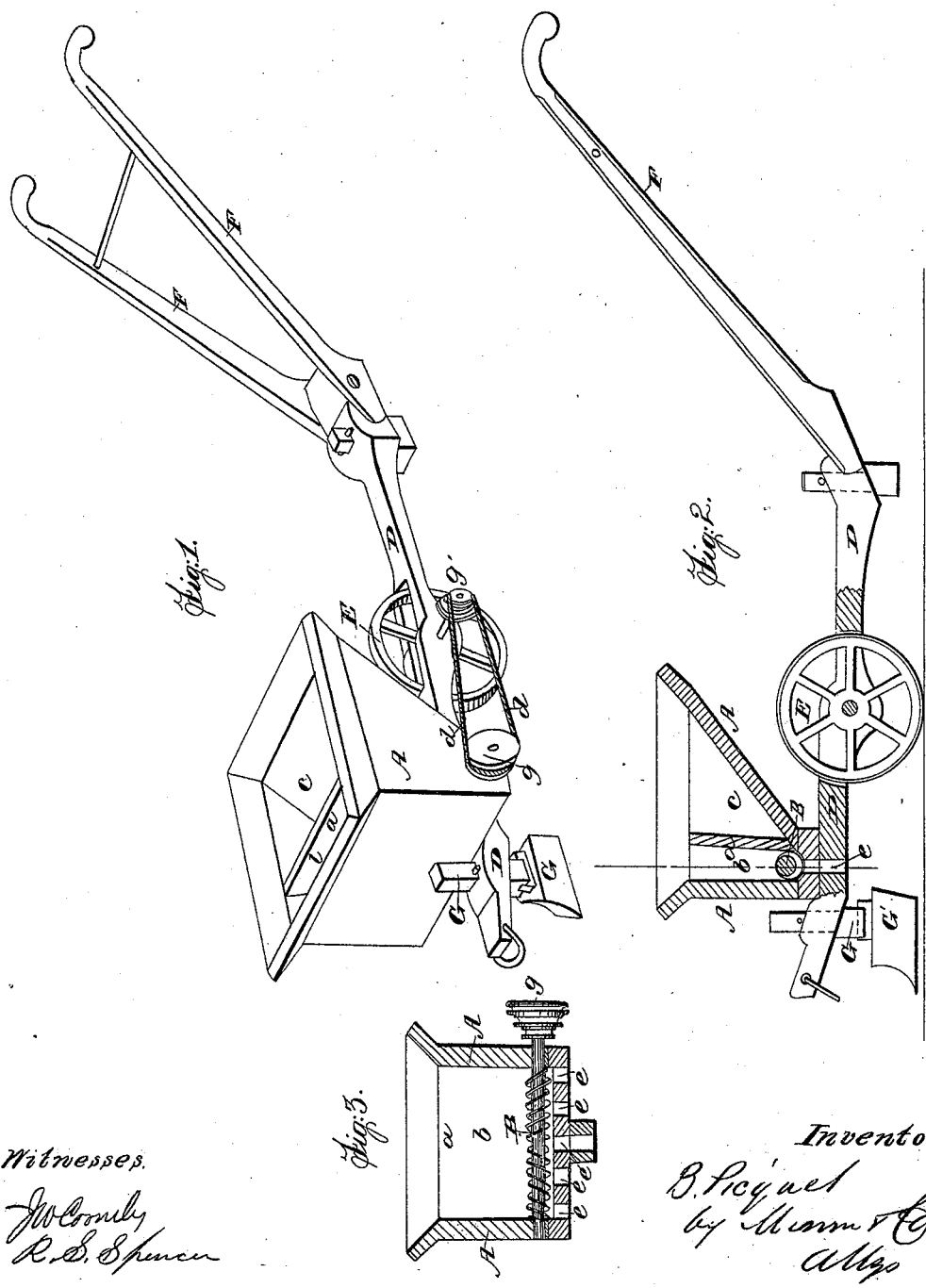

UNITED STATES PATENT OFFICE.

B. PICQUET, OF AUGUSTA, GEORGIA.

IMPROVEMENT IN MACHINES FOR SOWING FERTILIZERS.

Specification forming part of Letters Patent No. 30,887, dated December 11, 1860.

*To all whom it may concern:*

Be it known that I, B. PICQUET, of Augusta, in the county of Richmond and State of Georgia, have invented a new and Improved Machine for Sowing Guano or Seed; and I do hereby declare that the following is a full, clear, and exact description thereof, reference being had to the accompanying drawings, making part of this specification, in which—

Figure 1 is a perspective view of the improved guano or seed sowing machine. Fig. 2 is a vertical longitudinal section taken through the middle of the improved machine. Fig. 3 is a transverse vertical section through the hopper, showing the right and left screw sower.

Similar letters of reference indicate corresponding parts in the three figures.

This invention is an improvement in machines for scattering guano and other fertilizer, and for sowing seed either broadcast or in drills. It presents the use of a peculiar-shaped hopper, with a suitable number of holes made in a row in its bottom, over which holes a right and left screw-shaft is placed, which is turned by cone-pulleys and a belt communicating with a wheel, upon which the machine is mounted. The holes through the bottom of the hopper are furnished with plugs, so that by stopping up some of them the flow of guano or seed may be diminished, or by opening all the holes the guano may be scattered broadcast, as will be hereinafter described. Said scattering mechanism is furnished with a plow for loosening the earth and forming a furrow, and a scraper for covering up the fertilizer or seed and leveling the earth, as will be hereinafter described.

To enable those skilled in the art to fully understand my invention, I will proceed to describe its construction and operation.

In the accompanying drawings, A is a hopper with an inclined back running down to a narrow bottom, and a partition, *a*, in it, which divides the hopper into two compartments, *b c*. In the bottom of compartment *b*, and passing transversely across the hopper, is placed a double or right and left screw-shaft, B, the threads of which are quite wide, and they pitch both ways from the middle of the shaft, so as to feed from the middle of the hopper to the ends thereof when the shaft is turned in one direction, and vice versa. On one end of this screw-shaft is keyed, outside of the hopper, a cone-pulley, *g*, grooved to receive a belt, *d*. The bottom of the hopper has a row of holes, *e*, bored through it directly under the screw-shaft. The holes may be pretty close together from end to end of the hopper. These holes receive and discharge the fertilizer or seed, as the case may be, while the screws B regulate the flow and discharge equal quantities through the holes. This hopper, with its dropping device, is mounted on top of a plow-beam, D, near the front end of the beam, which beam is mounted on a wheel, E, placed behind the hopper, and it is furnished with handles F F, which enable the plowman to guide and to control the machine, which handles are attached to the rear end of beam D, as shown in the drawings, Figs. 1 and 2. In front of the hopper, and projecting down below the beam D, is a short standard, G, with a dovetail groove in its end, to which standard is attached, by a dovetail tenon, a plow, G', with a landside and mold-board, which plow open, the earth a sufficient depth for sowing. In the rear of the wheel E is placed a scraper, (not shown in the drawings, but it is simply a board placed obliquely to the beam or line of draft,) which covers the fertilizer deposited from the hopper and leaves the surface of the ground in a level state. The shaft or axle of the wheel E projects out from the beam and receives a cone-pulley, *g'*, over which passes the endless band *d*, from the pulley *g*. The wheel E thus transmits motion to the feeding-shaft B, and keeps it in constant rotation while the machine is moving over the ground.

From this description it will be seen that the screw-shaft will perform two offices, it will agitate the fertilizer and keep it from clogging up in the hopper, and it will spread the fertilizer uniformly from end to end of the hopper, so that an equitable distribution of the fertilizer will be obtained. Then, on reversing the motion of this shaft B, the greatest portion of the fertilizer will be carried toward the center of the hopper and there discharged.

Should it be desirable to sow in drills, the intermediate holes between the end ones are plugged with pins, or the holes of one half of the hopper-bottom may be plugged up, leaving the other half open.

Should it be found necessary, a wire sieve may be placed above the screw-shaft in the hopper, which will prevent any substance from passing through it that would be liable to affect the perfect working of the screw-shaft.

To regulate the flow of fertilizer from the hopper, irrespective of the number of holes opened or closed, the belt $d$ may be placed over smaller pulleys on the cones $g\ g'$, which will run the shaft B slower.

Having thus described my invention, what I claim as new, and desire to secure by Letters Patent, is—

The arrangement of the right and left screw B, variable driving-cones $g\ g$, apertures $e$, and partitioned hopper A, with the slotted beam D, wheel E, and adjustable plow and standard G G', as and for the purpose shown and described.

B. PICQUET.

Witnesses:
  I. P. GARVIN,
  LEWIS LEVY.